United States Patent
Loos

(10) Patent No.: US 8,718,895 B2
(45) Date of Patent: May 6, 2014

(54) METHOD FOR DETERMINING THE WHEEL PRESSURE IN AN ELECTRONICALLY ACTUATABLE MOTOR VEHICLE BRAKE CONTROL SYSTEM

(75) Inventor: Mirco Loos, Elversberg (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 1044 days.

(21) Appl. No.: 12/089,628

(22) PCT Filed: Sep. 1, 2006

(86) PCT No.: PCT/EP2006/065900
§ 371 (c)(1),
(2), (4) Date: Aug. 24, 2011

(87) PCT Pub. No.: WO2007/042349
PCT Pub. Date: Apr. 19, 2007

(65) Prior Publication Data
US 2012/0029785 A1 Feb. 2, 2012

(30) Foreign Application Priority Data
Oct. 12, 2005 (DE) .......................... 10 2005 049 300

(51) Int. Cl.
*B60T 13/66* (2006.01)
*B60T 13/68* (2006.01)

(52) U.S. Cl.
USPC ................. 701/78; 701/70; 701/93; 702/50; 180/170; 324/161

(58) Field of Classification Search
USPC ........ 701/70, 93, 78; 702/50; 303/117.1, 121, 303/113.1, 11; 180/170; 324/161
See application file for complete search history.

(56) References Cited

U.S. PATENT DOCUMENTS

| | | | |
|---|---|---|---|
| 6,003,960 A | 12/1999 | Gronau et al. | |
| 6,030,055 A | 2/2000 | Schubert | |

(Continued)

FOREIGN PATENT DOCUMENTS

| | | |
|---|---|---|
| DE | 10221456 | 2/2003 |
| DE | 10341027 | 3/2004 |

(Continued)

OTHER PUBLICATIONS

Design and Test on Fuzzy Neural Network of Constant Deceleration; Lei Yongtao ; Yang Zhaojian ; Liu Jinrong; Intelligent Computation Technology and Automation, 2009. ICICTA '09. Second International Conference on; vol. 2 Digital Object Identifier: 10.1109/ICICTA.2009.400; Publication Year: 2009 , pp. 685-688.*

(Continued)

*Primary Examiner* — Cuong H Nguyen

(57) ABSTRACT

A method is described in which the wheel pressure in an electronically controlled motor vehicle brake system is determined. The brake system includes inlet valves and outlet valves in the wheel circuits. At least one of the valves allows adjusting the valve current. The basis for this are previously determined calibration values which describe the opening current behavior of the outlet valve. A verification of the wheel pressure is performed during a wheel pressure control operation by briefly opening the outlet valve of one brake circuit. The current prevailing in this case can be taken into account as an indicator for determining the wheel pressure.

8 Claims, 2 Drawing Sheets

(56) References Cited

U.S. PATENT DOCUMENTS

| | | | |
|---|---|---|---|
| 6,048,038 | A | 4/2000 | Zaviska et al. |
| 6,086,167 | A | 7/2000 | Heckmann et al. |
| 6,256,569 | B1* | 7/2001 | Kobayashi ............... 701/70 |
| 6,782,796 | B2* | 8/2004 | Nakano ............... 91/434 |
| 6,943,540 | B2 | 9/2005 | Vincent et al. |
| 7,140,699 | B2 | 11/2006 | Gronau et al. |
| 7,234,435 | B2* | 6/2007 | Lewis et al. ............... 123/198 F |
| 2002/0026276 | A1* | 2/2002 | Hattori et al. ............... 701/96 |
| 2002/0096937 | A1* | 7/2002 | Nishikimi et al. ......... 303/117.1 |
| 2003/0085613 | A1* | 5/2003 | Nakano ............... 303/114.1 |
| 2003/0098613 | A1 | 5/2003 | Bohm et al. |
| 2006/0202552 | A1* | 9/2006 | Magel et al. ............... 303/142 |
| 2007/0112537 | A1 | 5/2007 | Gronau et al. |
| 2007/0252098 | A1* | 11/2007 | Schmidt et al. ......... 251/129.01 |
| 2011/0077831 | A1* | 3/2011 | Nishino et al. ............... 701/70 |
| 2011/0077832 | A1* | 3/2011 | Niino et al. ............... 701/70 |
| 2012/0038209 | A1* | 2/2012 | Yamamoto ............... 303/9.63 |
| 2012/0295762 | A1* | 11/2012 | Koike ............... 477/185 |
| 2012/0319462 | A1* | 12/2012 | Akita et al. ............... 303/2 |
| 2013/0106170 | A1* | 5/2013 | Baek ............... 303/11 |
| 2013/0116904 | A1* | 5/2013 | Watanabe et al. ............... 701/70 |
| 2013/0211685 | A1* | 8/2013 | Ullrich et al. ............... 701/70 |
| 2013/0245910 | A1* | 9/2013 | Watanabe ............... 701/79 |

FOREIGN PATENT DOCUMENTS

| | | | |
|---|---|---|---|
| WO | 2005009815 | | 9/2005 |
| WO | PCT/JP2009/005963 | * | 11/2009 |
| WO | PCT/IB2011/000186 | * | 2/2011 |
| WO | PCT/JP2011/050826 | * | 2/2011 |
| WO | PCT/JP2011/063671 | * | 6/2011 |
| WO | PCT/EP2011/065157 | * | 9/2011 |

OTHER PUBLICATIONS

An SOI-BiCDMOS Chipset for Automotive Electronically Controlled Brake System; Wasekura, M.; Fuwa, H.; Segawa, T.; Abo, S. International SOI Conference, 2006 IEEE; Digital Object Identifier: 10.1109/SOI.2006.284463; Pub. Year: 2006, pp. 117-118.*

EGR-VGT Control and Tuning for Pumping Work Minimization and Emission Control; Wahlström, J.; Eriksson, Lars; Nielsen, L. Control Systems Technology, IEEE Transactions on; vol. 18, Issue: 4; Digital Object Identifier: 10.1109/TCST.2009.2031473 Publication Year: 2010, pp. 993-1003.*

Application of a sliding mode control to anti-lock brake system; Seunghwan Baek; Jeonghoon Song; Duksun Yun; Heungseob Kim; Kwangsuck Boo; Control, Automation and Systems, 2008. ICCAS 2008. International Conference on; Digital Object Identifier: 10.1109/ICCAS.2008.4694661; Publication Year: 2008, pp. 307-311.*

An SOI-BiCDMOS Chipset for Automotive Electronically Controlled Brake System; Wasekura, M.; Fuwa, H.; Segawa, T.; Abo, S.; Inter. SOI Conf., 2006 IEEE; Dig.Obj.Id: 10.1109/SOI.2006.284463; Pub.Yr.: 2006, pp. 117-118.*

Research on the EHB system control method base on identification of drivers' braking intentions; Shou-tao Li et al.; Asian Control Conf., 2009. ASCC 2009. 7th; Pub. Yr: 2009, pp. 1439-1443.*

Modeling and simulation based on AMEsim of vehicle ESP hydraulic control unit; Yu Mengli; Yu Zhuoping; Xiong Lu; Computer Science and Automation Engineering (CSAE), 2012 IEEE Inter.Conf.on; vol. 1; Dig. Obj. Id.10.1109/CSAE.2012.6272589; Pub. Yr: 2012, pp. 242-246.*

* cited by examiner

METHOD FOR DETERMINING THE WHEEL PRESSURE IN AN ELECTRONICALLY ACTUATABLE MOTOR VEHICLE BRAKE CONTROL SYSTEM

BACKGROUND OF THE INVENTION

The present invention relates to a method in which the wheel pressure in an electronically controlled motor vehicle brake system is determined, in which case the brake system includes inlet valves (3) and outlet valves (4) in the wheel circuits, the purpose of which is to control the pressure in the actuators (A ... D) of the wheel brakes, with at least one of the valves, in particular all valves, in the area of the actuator being driven by way of one or more driver stage(s) which permits or permit adjusting the valve current. An electronically controlled calibration method of the outlet valve (4) is performed at least one single time, such method being used to calibrate one or more outlet valves in terms of their opening current behavior, and the outlet valve of one brake circuit is opened briefly by a corresponding electric actuation of the valve during a wheel pressure control operation for verification of the wheel pressure, and the current is measured in this case which flows exactly when the valve has opened (opening current), and the current measured is used as an indicator for determining the wheel pressure, taking into consideration the calibration values for the corresponding outlet valve which have been determined according to the calibration method.

Electronic brake control systems for ABS/ESP are fitted in up-to-date motor vehicles in many cases. The quality of the control of the brake pressure in an actuator of the wheel brake, among others, depends substantially on the knowledge about the current wheel pressure of the fluid which is used for pressure buildup. Therefore, pressure sensors are provided in each wheel circuit in addition to sensors which determine the pilot pressure. Besides, the quality of wheel pressure control can be improved further when the inlet valves are not only switching (digital valves) but are operated in analog or analogized fashion (A/D valves). The minimum requirement for a corresponding A/D actuation control is a pulse-width modulated current control which necessitates a corresponding current driver in the electronics of the brake control unit. For reasons of costs of manufacture, the increasing tendency is to substitute equivalent variables produced by pressure models for the pressure information received from the pressure sensors in the wheel circuits. It is this way possible to furnish a high quality of wheel control and save the additional costs for several pressure sensors in addition.

As stated above, it is known in the art to calculate the pressure that prevails in the actuator for the wheel (wheel pressure) using a so-called wheel model. As disclosed in the document WO 2004/101339 A1, this can be achieved in conventional brake control systems with inlet valves in a rather reliable fashion by balancing the pressure buildup times and the pressure reduction times on the basis of a self-learning algorithm, which monitors the current wheel control operations. In the event of more comfortable brake systems with A/D inlet valves, however, more pronounced differences will occur between the pressure defined by the model and the actual wheel pressure in some cases.

The invention at topic has for its object to still further improve a brake system of this type without wheel pressure sensors so that the quality of the brake control is still further enhanced, in particular in the ABS operation, with the result that the stopping distance is principally shortened.

SUMMARY OF THE INVENTION

This object is achieved according to the invention by the method in which the wheel pressure in an electronically controlled motor vehicle brake system is determined, in which case the brake system includes inlet valves (3) and outlet valves (4) in the wheel circuits, the purpose of which is to control the pressure in the actuators (A ... D) of the wheel brakes, with at least one of the valves, in particular all valves, in the area of the actuator being driven by way of one or more driver stage(s) which permits or permit adjusting the valve current. An electronically controlled calibration method of the outlet valve (4) is performed at least one single time, such method being used to calibrate one or more outlet valves in terms of their opening current behavior, and the outlet valve of one brake circuit is opened briefly by a corresponding electric actuation of the valve during a wheel pressure control operation for verification of the wheel pressure, and the current is measured in this case which flows exactly when the valve has opened (opening current), and the current measured is used as an indicator for determining the wheel pressure, taking into consideration the calibration values for the corresponding outlet valve which have been determined according to the calibration method.

To allow implementation of the method of the invention, it is first of all required to know as precisely as possible about the opening current characteristic curve of the outlet valve. To this end, a calibration method is preferably implemented in which the valve actuation current is varied and the current at which the valve opens or closes is determined by an anomaly of the current or the voltage, respectively, across the valve coil or across a measuring coil arranged in the area of the coil magnetic circuit. Corresponding methods for determining the valve opening current are per se known in connection with inlet valves. Thus, the document WO 2005/009815 A2, for example, describes a method of determining an opening current characteristic curve in a motor vehicle brake control unit, which allows determining the calibration values for the opening current characteristic curve in a pressureless fashion. The above-mentioned calibration methods for determining an opening current curve, which can be implemented according to the invention, can be performed in the plant and/or at the assembly line and/or during service of a motor vehicle, in which case (as has been suggested already in WO 2005/009815 A2) the sole or at least predominant implementation of the last mentioned method is particularly suitable because it brings about a considerable cost saving advantage in manufacture.

For verification of the wheel pressure, the outlet valve of a brake circuit is then opened for a brief interval by corresponding electric actuation of the valve. The opening current characteristic curve furnishes the interrelationship between current and pressure, at which the set current (magnetic force in the coil) is in balance with the hydraulic force generated. This means that the magnetic force, which is produced by the coil through which current is flowing, is exactly as high as the hydraulic force which acts upon the sealing diameter of the closed valve. Consequently, the opening current characteristic curve provides the interrelationship between the differential pressure at the valve and the magnetic force produced by a current. The current which is flowing in this case and is predetermined or measured, indicates at which current the valve has just opened (opening current). With the opening current characteristic curve being known, it is hence possible to infer the pressure difference that prevails at the valve when the opening current is measured. The pressure difference prevailing at the outlet valve generally corresponds to the currently prevailing wheel pressure in addition. It is assumed in this respect that principally no appreciable pressure is prevailing behind the outlet valve. In a conventional brake system, the low-pressure accumulator, for example, is arranged behind the outlet valve, and can take up a maximum of pressure in the range of 3 bar. Thus, the invention renders it possible to determine the wheel pressure at least within a certain tolerance.

During wheel pressure control, it is then preferred to make a comparison between the pressure which is this way determined on the basis of the opening current and the pressure which is determined according to a per se known pressure model. In principle, this wheel pressure test can be carried out during each pressure buildup cycle of an electronically controlled wheel control. In order to minimize the pressure fluid loss in the wheel pressure test, it is however suitable to perform this test only now and then, that means, not with every pressure increase pulse. The point of time of such a wheel pressure test can be made dependent particularly on criteria which indicate a pressure difference. As an alternative, it is especially possible that the wheel pressure test is executed on a regular basis, e.g. after a predetermined number of pulses.

Preferably, the electronics of the motor vehicle brake system of the invention additionally includes current driver stages in the area of the current actuation control of the outlet valves, which drivers allow controlling the valve current. To this end, the corresponding electric valve connections of the outlet valves are connected especially with a device for pulse width modulation.

Hereinbelow, the method according to the invention will be described in detail by way of example relating to a Figure.

DETAILED DESCRIPTION OF THE DRAWINGS

Figure 1:
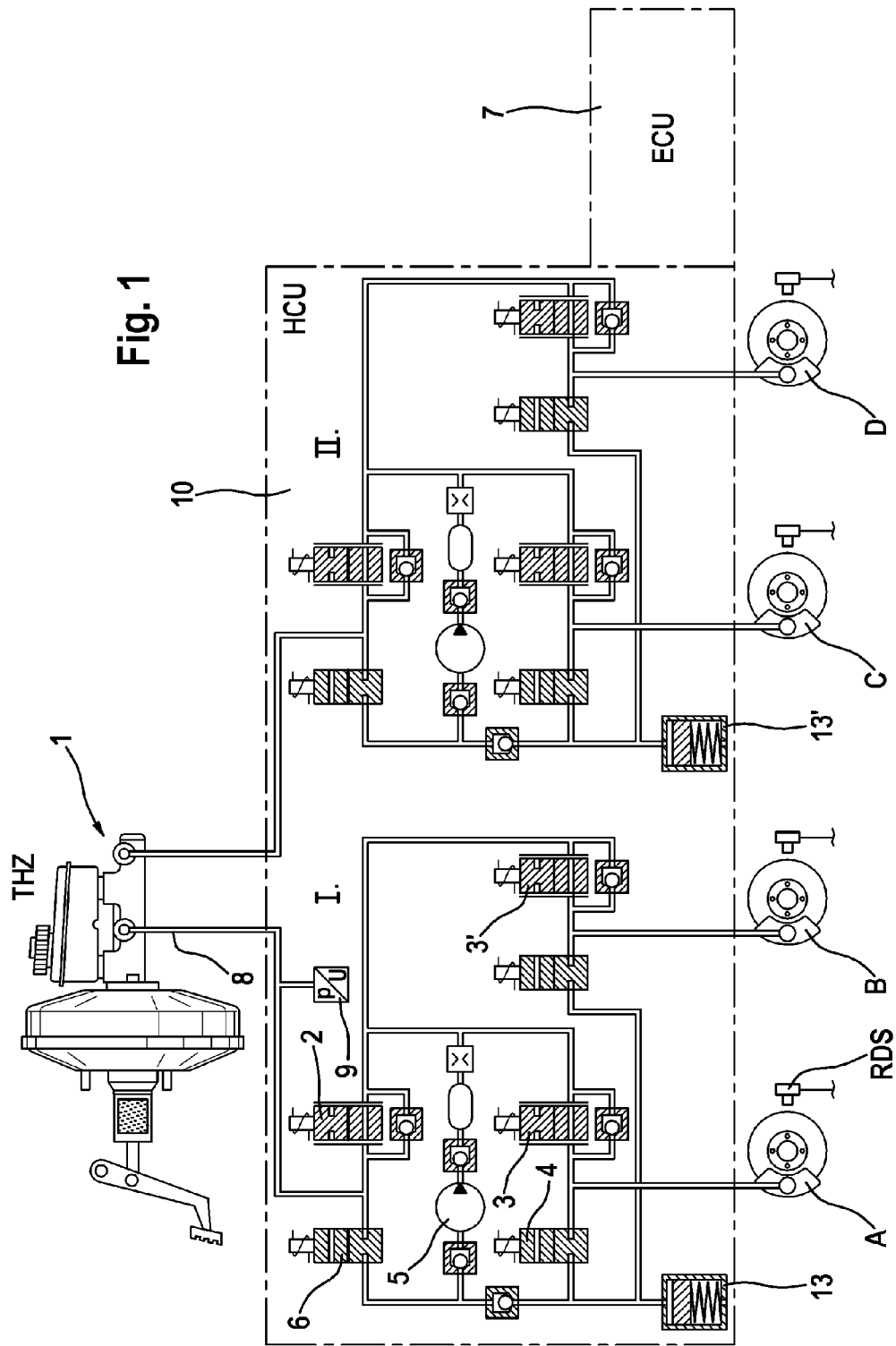
FIG. 1 is a schematic representation of a brake device with analog controllable valves.

In FIG. 1, tandem master cylinder (TMC) 1 is connected to valve block 10 of an electronic motor vehicle brake system. Electronic unit 7 comprises a microcontroller system by means of which the actuators and sensors comprised in the valve block are electronically controlled and measurements are performed. Valve block 4 comprises two brake circuits I and II. Furthermore, each brake circuit comprises two wheel pressure circuits (A, B and C, D, respectively) with respectively one analog controllable inlet valve 3 and an outlet valve 4, which can also be actuated by ECU 7 using PWM current control. Reference numeral 2 designates a normally open separating valve, while reference numeral 6 is assigned to a normally closed electronic change-over valve.

Besides, a low-pressure accumulator 13 and 13' is connected in the second brake circuit II downstream of the outlet valve and upstream of pump 5. An inlet pressure sensor 9 is disposed in the hydraulic conduit 8 that leads to the master cylinder 1. There are no further pressure sensors in the wheel pressure circuits. Pump 5 is used for the independent pressure buildup, for example, in a case of TCS or ESP.

Outlet valve 4 is a normally closed NC valve (digital valve), which is actuated by a driver within the electronics of ECU 7 in such a fashion that the current can be found out at which the outlet valve is switching. In contrast to an analog valve, the abrupt change in position of the armature allows recognizing the moment of switch-over relatively clearly in a normally closed NC-valve. An opening current characteristic curve for valve 4 can be determined by measuring at different pilot pressures during non-controlled brake operations and by defining the pilot pressure by way of pressure sensor 9.

Based on the opening current characteristic curve determined according to this method, it is then possible to determine the pressure in the wheel cylinders by way of the opening behavior of the outlet valve 4 during ABS control. The outlet valve 4 is actuated by means of a current ramp for this purpose. The reaction of the tappet is detected and the present current is stored. Subsequently, valve 4 is immediately closed again in order to minimize the loss in hydraulic means inside the wheel brake to be greatest extent possible. The wheel pressure can be inferred from this current by means of the known opening current characteristic curve.

Figure 2:
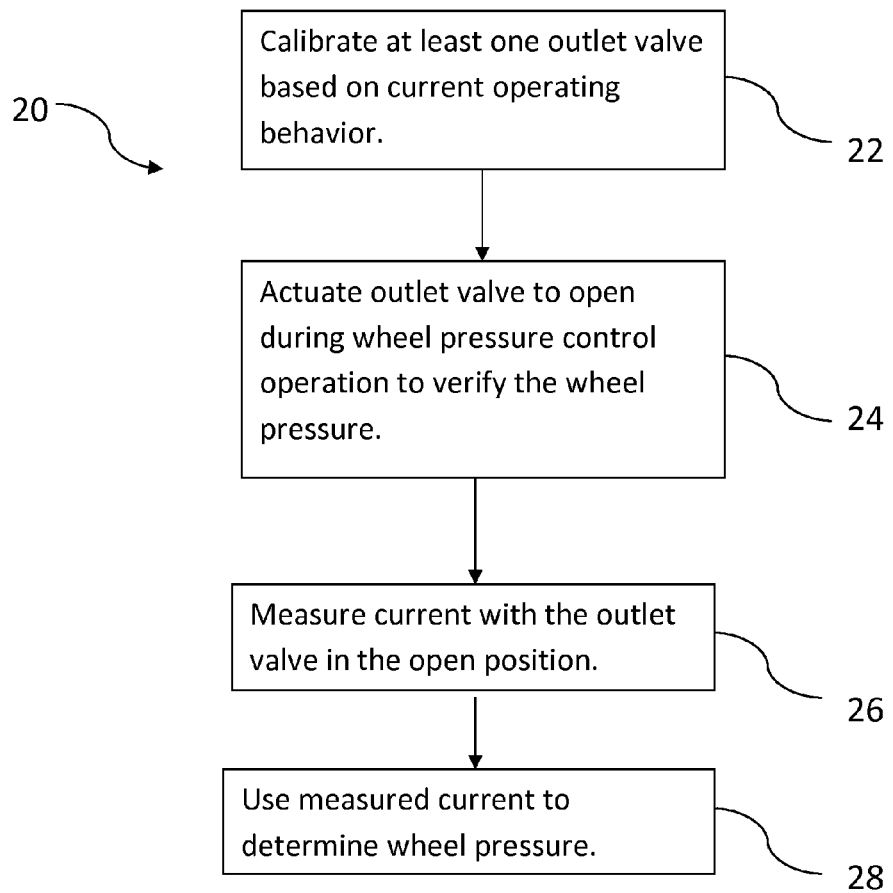
FIG. 2 is a schematic illustration of a method for determining wheel pressure in an electronically controlled motor vehicle brake system.

Referring to FIGS. 1 and 2 a method, shown at 20, for determining wheel pressure in an electronically controlled motor vehicle brake system is illustrated. At least one outlet valve (4) at least one time is calibrated, step 22. One or more outlet valves are calibrated in terms of their opening current behavior and the valve actuation current is varied and the current at which the valve opens or closes is determined by an anomaly of the current or the voltage, respectively, across the valve coil or across a measuring coil arranged in the area of the coil magnetic circuit. Opening of the outlet valve of one brake circuit is achieved by a corresponding electric actuation of the valve during a wheel pressure control operation for verification of the wheel pressure, step 24. A current which flows when the valve has opened is measured, step 26. The wheel pressure is determined using the current measured is used as an indicator for determining the wheel pressure, taking into consideration the calibration values for the corresponding outlet valve which have been determined according to the calibration method, step 28.

The invention claimed is:

1. A method for determining wheel pressure in an electronically controlled motor vehicle brake system, wherein the brake system includes inlet valves (3) and outlet valves (4) in wheel circuits for controlling a pressure in actuators (A . . . D) of the wheel brakes, with at least one of the valves in an area of the actuator being driven by way of one or more driver stage(s) which permits or permit adjusting the valve actuating current, the method comprising:
    calibrating at least one outlet valve (4) at least one time, wherein one or more outlet valves are calibrated in terms of their opening current behavior, wherein the valve actuation current is varied and the current at which the valve opens or closes is determined by an anomaly of the current or the voltage, respectively across a valve coil or across a measuring coil arranged in an area of a coil magnetic circuit;
    opening the outlet valve of one brake circuit by a corresponding electric actuation of the valve during a wheel pressure control operation for verification of the wheel pressure;
    measuring the actuating current which flows when the valve has opened; and
    determining the wheel pressure using the current measured is used as an indicator for determining the wheel pressure, taking into consideration the calibration values for the corresponding outlet valve which have been determined according to the calibration method.

2. The method as claimed in claim 1, wherein a comparison between the pressure which is determined by way of the current and the pressure which is determined according to a per se known pressure model is performed to improve the wheel control.

3. The method as claimed in claim 1, wherein for opening the outlet valve, the current is increased by means of a ramp, and in event of an anomaly of the current or the voltage, respectively, across the valve coil or across a measuring coil arranged in the area of the coil magnetic circuit, which indicates an armature/tappet movement, a present current is determined and thereafter the valve is closed again by quickly decreasing the current.

4. The method as claimed in claim 1, wherein the pressure value determined by means of the method is reported by the ECU to another vehicle system.

5. The method as claimed claim 1, wherein the brake system at most includes one pressure sensor per brake circuit to determine a pilot pressure of a pressure fluid.

6. The method as claimed in claim 1, wherein both the inlet valves and the outlet valves are connected to a driver stage which allows an individual current adjustment.

7. The method as claimed in claim 1, wherein the calibrating at least one valve is executed during driving and during non-controlled brake operations.

8. The method as claimed in claim 1, wherein the verification of the wheel pressure is performed before or subsequent to a pressure increase pulse train.

\* \* \* \* \*